(12) United States Patent
Duoss et al.

(10) Patent No.: US 11,309,574 B2
(45) Date of Patent: Apr. 19, 2022

(54) SYSTEMS AND METHODS FOR ELECTRICAL ENERGY STORAGE

(71) Applicants: Eric Duoss, Danville, CA (US); Juergen Biener, Castro Valley, CA (US); Patrick Campbell, Oakland, CA (US); Julie A. Jackson, Livermore, CA (US); Geoffrey M. Oxberry, Pleasanton, CA (US); Christopher Spadaccini, Oakland, CA (US); Michael Stadermann, Pleasanton, CA (US); Cheng Zhu, Livermore, CA (US); Bradley Trembacki, Austin, TX (US); Jayathi Murthy, Austin, TX (US); Matthew Merrill, Charlottesville, VA (US)

(72) Inventors: Eric Duoss, Danville, CA (US); Juergen Biener, Castro Valley, CA (US); Patrick Campbell, Oakland, CA (US); Julie A. Jackson, Livermore, CA (US); Geoffrey M. Oxberry, Pleasanton, CA (US); Christopher Spadaccini, Oakland, CA (US); Michael Stadermann, Pleasanton, CA (US); Cheng Zhu, Livermore, CA (US); Bradley Trembacki, Austin, TX (US); Jayathi Murthy, Austin, TX (US); Matthew Merrill, Charlottesville, VA (US)

(73) Assignees: Lawrence Livermore National Security, LLC, Livermore, CA (US); Board of Regents, The University of Texas System, Austin, TX (US)

(*) Notice: Subject to any disclaimer, the term of this patent is extended or adjusted under 35 U.S.C. 154(b) by 1239 days.

(21) Appl. No.: 14/947,620

(22) Filed: Nov. 20, 2015

(65) Prior Publication Data

US 2017/0149083 A1    May 25, 2017

(51) Int. Cl.
     *H01G 11/26*      (2013.01)
     *H01M 10/02*      (2006.01)
     (Continued)

(52) U.S. Cl.
     CPC ............. *H01M 10/02* (2013.01); *B33Y 80/00* (2014.12); *H01G 11/26* (2013.01); *H01G 11/28* (2013.01);
     (Continued)

(58) Field of Classification Search
None
See application file for complete search history.

(56) References Cited

U.S. PATENT DOCUMENTS

2009/0291368 A1* 11/2009 Newman .................. H01M 4/29
     429/245
2013/0084501 A1* 4/2013 Wakayama ......... H01M 4/1397
     429/231.8

(Continued)

OTHER PUBLICATIONS

Scherer, M. R. J., "Double-Gyroid-Structured Functional Materials, Springer Theses", (2013), 211 pp (Note: pp. 1-20 appear to be most pertinent).

(Continued)

*Primary Examiner* — Haixia Zhang
(74) *Attorney, Agent, or Firm* — Harness, Dickey & Pierce, P.L.C.

(57) ABSTRACT

The present disclosure relates to an electrical energy storage apparatus which forms an interpenetrating, three dimensional structure. The structure may have a first non-planar channel filled with an anode material to form an anode, and a second non-planar channel adjacent the first non-planar channel filled with a cathode material to form a cathode. A third non-planar channel may be formed adjacent the first and second non-planar channels and filled with an electrolyte. The first, second and third channels are formed so as to (Continued)

be interpenetrating and form a spatially dense, three dimensional structure. A first current collector is in communication with the first non-planar channel and forms a first electrode, while a second current collector is in communication with the second non-planar channel and forms a second electrode. A separator layers separates the current collectors.

8 Claims, 7 Drawing Sheets (51) Int. Cl.
    B33Y 80/00    (2015.01)
    H01M 4/02    (2006.01)
    H01M 10/04    (2006.01)
    H01G 11/52    (2013.01)
    H01G 11/28    (2013.01)

(52) U.S. Cl.
    CPC ............. H01G 11/52 (2013.01); H01M 4/02 (2013.01); H01M 10/04 (2013.01)

(56) References Cited

U.S. PATENT DOCUMENTS

| 2014/0000509 A1 | 2/2014 | Wei et al. |
| 2014/0050988 A1 | 2/2014 | Wei et al. |
| 2014/0001477 A1 | 5/2014 | King et al. |
| 2014/0147747 A1 | 5/2014 | King et al. |
| 2017/0104198 A1* | 4/2017 | Duoss ................ H01M 2/1653 |

OTHER PUBLICATIONS

Dierkes, Ulrich et al. "Minimal Surfaces," Springer: Berlin Heidelberg 2010 (82pp).
Hart, Ryan W. et al. "3-D Microbatteries", Electrochemistry Communications, vol. 5 (2003), pp. 120-123.
Arthur, Timothy S. et al. "Three-dimensional electrodes and battery architectures", Mrs Bulletin, vol. 36, Jul. 2011, pp. 523-531.
Sun, Ke et al. "3D Printing of Interdigitated Li-Ion Microbattery Architectures", Adv. Mater., Vo. 25 (2013), pp. 4539-4543.
Long, Jeffrey W. "Three-Dimensional Battery Architectures", Chem. Rev., vol. 104, (2003) pp. 4463-4492.
Schoen, Alan H. "NASA Technical Note, Infinite Periodic Minimal Surfaces Without Self-Intersections", National Aeronautics and Space Administration, Washington, D.C., May 1970, 100 pp.
Pikul, J. H., Zhang, H. G., Cho, J., Braun, P. V., King, W. P. "High-power lithium ion microbatteries from interdigitated three-dimensional bicontinuous nanoporous electrodes", Nature Communications 4:1732. DOI 10.1038/ncomms2747, 5 pp; http://braungroup.beckman.illinois.edu/pvb140.pdf.
Braun, P. V., Cho, J., Pikul, J. H., King, W. P., Zhang, H. "High power rechargeable batteries", Current Opinion in Solid State and Materials Science, 16 (2012), pp. 186-198; http://braungroup.beckman.illinois.edu/pvb126.pdf.

* cited by examiner

Schwartz P Surface

FIGURE 4

Schwartz D Surface

FIGURE 5

Neovius Surface

FIGURE 6

N14 Surface

FIGURE 7

N26 Surface

FIGURE 8

N38 Surface

FIGURE 9

Diamond

FIGURE 10

Double Diamond

SYSTEMS AND METHODS FOR ELECTRICAL ENERGY STORAGE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to energy storage devices, and more particularly to highly penetrating, high surface area, three-dimensional structures for electrical energy storage.

BACKGROUND

The statements in this section merely provide background information related to the present disclosure and may not constitute prior art.

Over the past fifteen years or so, the proliferation of mobile electronics and electric vehicles has created an increasing demand for high-performance batteries that are lighter and store more energy on a single charge. Most improvements in battery technology have focused on achieving these objectives by developing new and better materials for the five main components of the battery: anode, cathode, conductive filler, electrolyte, and (if necessary) the separator. However, these previous efforts at improving battery technology have generally focused more on the materials used for the battery, but have largely ignored exploring the geometrical arrangement or internal "shape" or topology of a battery for the purpose of obtaining improvements in battery performance. There is also increasing interest in designing optimal internal micro or nanoscale structure for a macroscale object shape.

It will also be understood that conventional battery designs are generally planar. With a generally planar construction, the anode, separator and cathode of the battery are stacked on top of one another. These layers are then generally packaged in a planar form factor. Alternatively, these layers may be rolled up like a jelly roll and packaged into a cylindrical form factor.

Researchers have recently manufactured electrodes (i.e., anodes and cathodes) using geometries such as interdigitating combs or interdigitating posts. However, these efforts have not generally explored the possibility of increasing the performance of a battery by tailoring or controlling its physical geometry.

Some efforts have been made with regard to battery architecture, particularly involving designs using gyroid-like structures. U.S. Patent Publication No. 2014/0147747 discusses the construction of microbatteries using porous electrode architectures. U.S. Patent Publication No. 2014/0050988 discusses the use of gyroid structures (not any other minimal or triply periodic surfaces) specifically to form a charge collector. The charge collector is also known as a "current collector." This is the structure used to provide a path for electric current to or from the battery electrodes (anode and cathode).

SUMMARY

In one aspect the present disclosure relates to an electrical energy storage apparatus comprising an interpenetrating, three dimensional structure including an electrolyte material, a first non-planar layer of anode material to form an anode, and a second non-planar layer of cathode material channel adjacent the first non-planar layer of anode material which includes a cathode material to form a cathode. The first and second non-planar layers may be formed to be interpenetrating. A first current collector may be formed so as to be in communication with the first non-planar layer of anode material, and thus form a first electrode. A second current collector may be formed as a second electrode in communication with the second non-planar layer of cathode material. A separator layer may separate the current collector layers.

In another aspect the present disclosure relates to an electrical energy storage apparatus. The apparatus may comprise an interpenetrating, three dimensional structure formed from an ionically conductive solid electrolyte material having a plurality of interpenetrating, non-planar channels. The channels may include a first plurality of channels filled with an anode material, and a second plurality of channels adjacent the first plurality of channels, and interpenetrating the first plurality of channels, and being filled with a cathode material. A third plurality of channels may be formed adjacent, and interpenetrating, the first and second pluralities of channels and may be filled with a material to form a separator. The first, second and third channels may be formed so as to form a spatially dense, three dimensional structure. A first current collector is provided in communication with the first plurality of channels, and forms a first electrode. A second current collector is formed to act as a second electrode which is in communication with the second plurality of channels.

In another aspect the present disclosure relates to a method for forming an electrical energy storage apparatus configured as a three dimensional, periodic structure. The method may comprise forming an interpenetrating, three dimensional structure having a first non-planar channel and a second non-planar channel in proximity to the first non-planar channel. The first and second non-planar channels may further be interpenetrating. The first non-planar channel may be filled with an anode material to form an anode. The second non-planar channels may be filled with a cathode material to form a cathode. Areas adjacent the first and second non-planar channels may be filled with an electrolyte. A first electrode may be formed to operate as a current collector, which is in electrical contact with portions of the anode material. A second electrode may be formed to operate as an electrode, which is in electrical contact with portions of the cathode material.

In still another aspect the present disclosure relates to a method for forming an electrical energy storage apparatus configured as a three dimensional structure. The method may comprise forming a structure using an ionically conductive material. First and second non-planar channels may be formed in the ionically conductive material in proximity to one another, with the first and second non-planar channels further being interpenetrating. The first non-planar channels may be filled with an anode material to form an anode. The second non-planar channels may be formed with a cathode material to form a cathode. Areas adjacent the first and second non-planar channels may be filled with an electrolyte. A first electrode may be formed to operate as a current collector, which is in electrical contact with portions of the anode material. A second electrode may be formed to operate as a current collector, which is in electrical contact with portions of the cathode material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The various embodiments of the present disclosure generally relate to a class of microscale or nanoscale designs for three-dimensional, ("3D") structures. In one example the 3D structure is an electrical energy storage device, as will be described in detail herein. The 3D structure may be periodic or aperiodic. It may be ordered or disordered, but an important feature is that it is interpenetrating and 3D for all of the materials being used to form the structure. It could be graded density and feature sizes could change throughout the structure. As will become more apparent from the following discussion of a 3D energy storage device, as feature size decreases, the surface area increases and transport distances are reduced.

The 3D architectures disclosed herein are especially well suited for batteries where the anode, cathode, separator, electrolyte, and/or current collector are patterned into highly interpenetrating but discrete phases that have high surface areas and small transport distances while maximizing the amount of active material (i.e., anode or cathode) that can be packed into a given volume. The various embodiments disclosed herein have greater areal, volumetric, or gravimetric power density for a given energy density (or power density) compared to conventional battery designs based on planar layouts such as flat plates, jelly roll layouts, etc., or interdigitated geometries such as combs and posts. The power density may be limited by mass transport. The energy density is given by the nature and the packing density of the active material. As a result, for a given power load, the architectures disclosed herein may be used to manufacture batteries that last longer.

Figure 1:
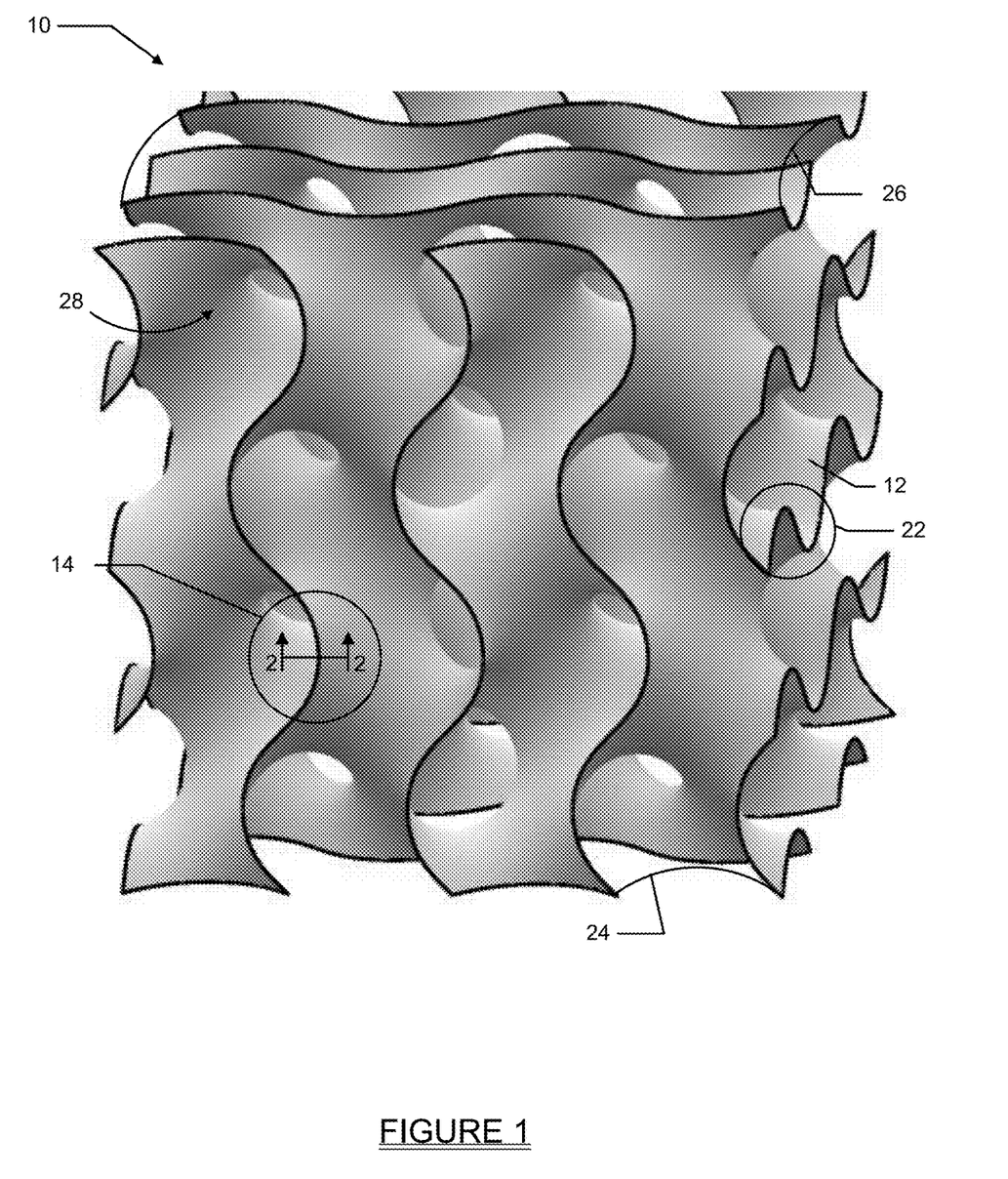
FIG. 1 is a high level perspective view of a portion of a structure forming a 3D, periodic, energy storage device with interpenetrating wall portions, and where the 3D structure takes the form of a gyroid.

Referring to FIG. 1 there is shown a simplified representation of a 3D energy storage apparatus 10 (hereinafter simply "3D structure 10") having interpenetrating layer portions that forms an electrical energy storage device. In this example the structure 10 takes the form of a gyroid, although it will be appreciated from the following discussion that a wide plurality of other 3D structures with interpenetrating walls or surface portions may be substituted for a gyroid. However, it will be appreciated that the anode, cathode, separator/electrolyte, and current collectors may or may not have all the same shape.

The 3D structure 10 of FIG. 1 includes 3D surface wall portions 12 which are formed relative to one another to be interpenetrating. By "interpenetrating" it is meant that one wall portion 12 cannot be disengaged from the other by any combination of translations or rotations. That is, in order to separate the two wall portions, which are not connected, one of the wall portions must be cut. Another example of an interpenetrating structure would be two links of a chain.

Figure 2:
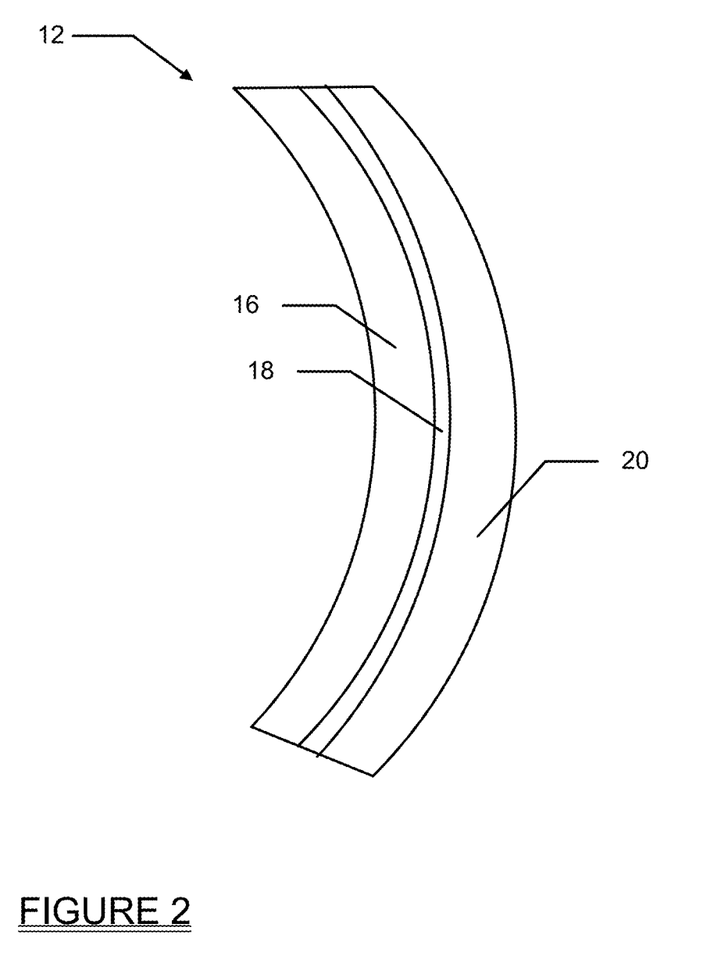
FIG. 2 is a cross sectional view of a portion of one of the material layers of the 3D structure of FIG. 1 taken in accordance with section line 2-2 in FIG. 1.

A small cross-sectional section 14 of just a portion of one of the surface wall portions 12 is shown in FIG. 2. In FIG. 2, surface wall portion 12 may be formed to include an anode material layer 16, a separator material layer 18 and a cathode material layer 20. The interpenetrating nature of the wall portions 12 can be noted, for example, at area 22. It should be noted that it is impossible to go from anode material layer 16 to cathode material layer 20 without penetrating the separator material layer 18 (FIG. 2).

With further reference to FIG. 1, portions of all of the anode material layers 16 may be connected by an electrically conductive material layer or sheet 24. Portions of all of the cathode material layers 20 may be connected by a separate electrically conductive material layer or sheet 26. Material sheets 24 and 26 form current collectors, also sometimes referred to as electrodes. The material sheets 24 and 26 have portions (not shown) where power connections can be made to some external device to allow stored electrical power from the 3D structure 10 to be used to power the external device. It will be understood that no portion of electrically conductive material sheet 24 contacts any of the cathode material layers 20, and no portion of the material sheet 26 contacts any portion of the anode material layers 16. These can be separated by a solid separator electrolyte or by a gap or void that is filled with liquid electrolyte. Liquid electrolytes are actually faster due to diffusion. In either event, when an electrolyte is used to fill areas 28, this places the electrolyte in contact with all of the anode material layers 16 and all of the cathode material layers 20, thus filling all of the voids within the 3D structure 10.

The 3D surfaces used for patterning may be parametric. For a gyroid, for instance, boundaries of three-dimensional gyroid structures can be defined by the equations:

$$\sin(2*pi*x/L)*\cos(2*pi*y/L)+\sin(2*pi*y/L)*\cos(2*pi*z/L)+\sin(2*pi*z/L)*\cos(2*pi*x/L)=+t/2$$
$$\text{and } \sin(2*pi*x/L)*\cos(2*pi*y/L)+\sin(2*pi*y/L)*\cos(2*pi*z/L)+\sin(2*pi*z/L)*\cos(2*pi*x/L)=-t/2 \quad [6],$$

so that the thickness of the gyroid is the parameter "t" and its period (i.e., the length of a unit cell) is "L".

Controlling the thickness of the surface wall portions 12 tunes ion transport properties so that active material is depleted from the anode material layer 16 evenly. Consequently, for different active materials, the thickness of the surface(s) used in the design may change. In general, thinner is better. Ideally, the active materials should have a nanoscale thickness.

It is also expected that manufacturability constraints are likely to also place constraints on the thickness of the surface, as well as its unit cell length.

A 3D electrical energy storage structure such as 3D structure 10 in FIG. 1 may be manufactured using present day 3D printing or 3D fabrication processes. If manufactured using a well known 3D printing process, then the 3D structure 10 will be manufactured as a series of discrete layers successively formed one on top of another. In this fashion the channels necessary to form the anode layer, the cathode layer, and any other material layers (e.g., separator layer) would be formed substantially simultaneously as each layer is printed when the different types of material are deposited by different print heads of a 3D printing system.

Figure 3:
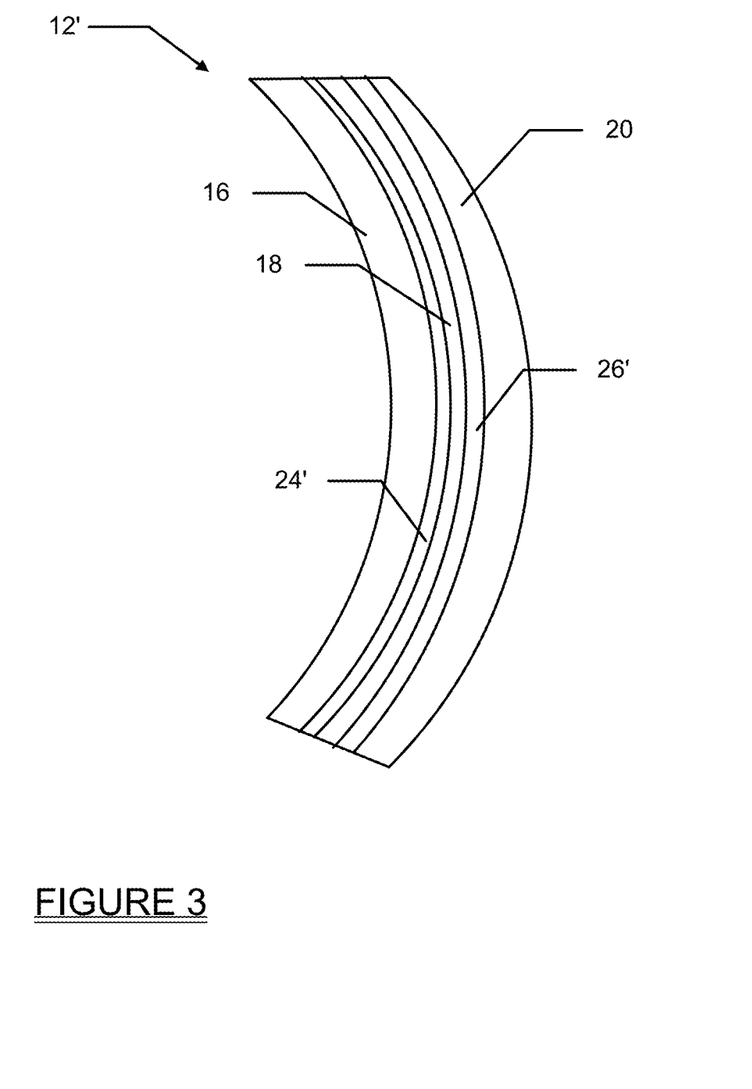
FIG. 3 is a highly simplified view of a portion of a 3D solid electrolyte structure, made with a 3D printing process, having interpenetrating channels formed therein which are filled with anode and cathode materials.
Figure 4:
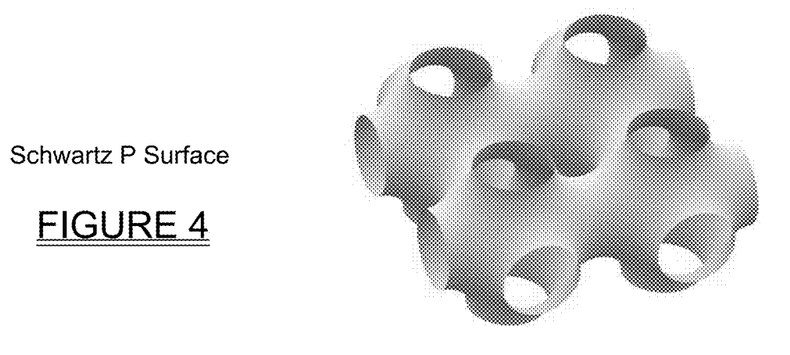
FIG. 4 is a simplified illustration of a Schwartz P surface that may be used to construct a 3D energy storage apparatus in accordance with the present disclosure.
Figure 5:
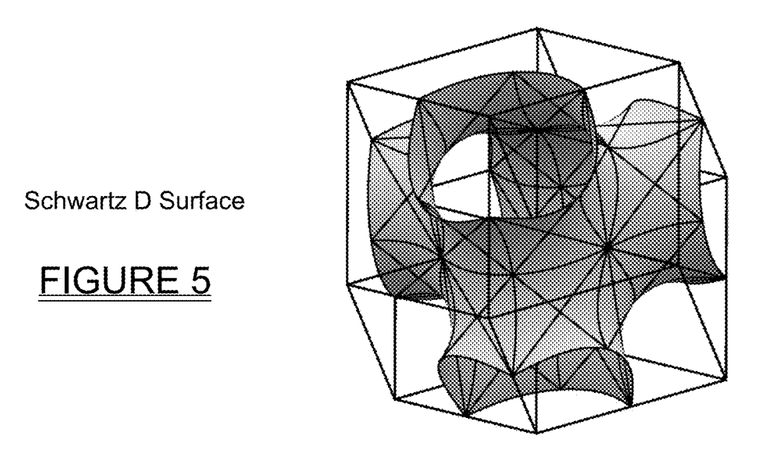
FIG. 5 is a simplified illustration of a Schwartz D surface that may be used to construct a 3D energy storage apparatus in accordance with the present disclosure.
Figure 6:
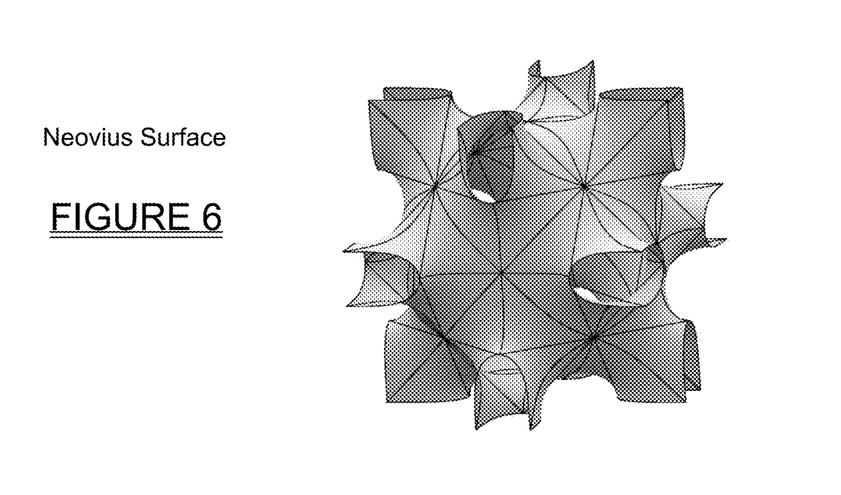
FIG. 6 is a simplified illustration of a Neovius surface that may be used to construct a 3D energy storage apparatus in accordance with the present disclosure.
Figure 7:
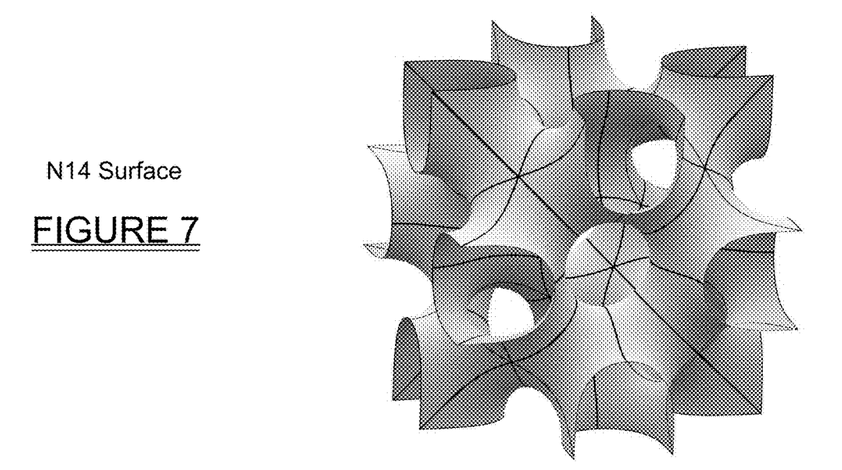
FIG. 7 is a simplified illustration of a N14 Surface that may be used to construct a 3D energy storage apparatus in accordance with the present disclosure.
Figure 8:
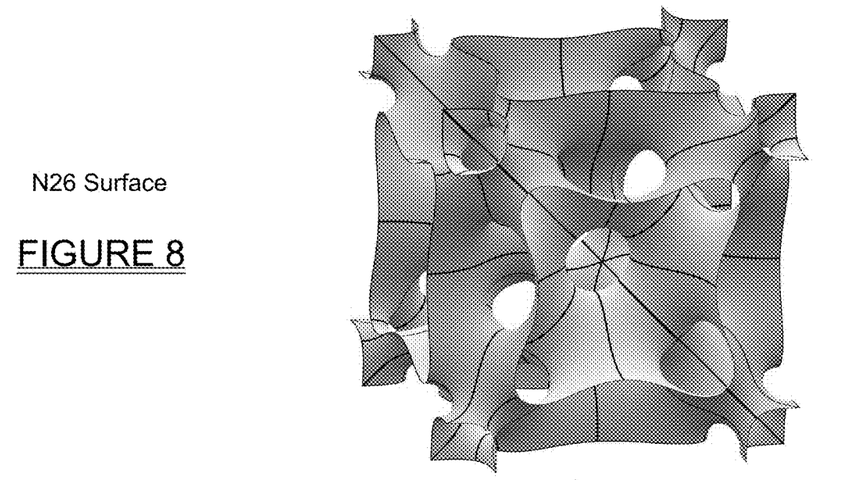
FIG. 8 is a simplified illustration of a N26 Surface that may be used to construct a 3D energy storage apparatus in accordance with the present disclosure.
Figure 9:
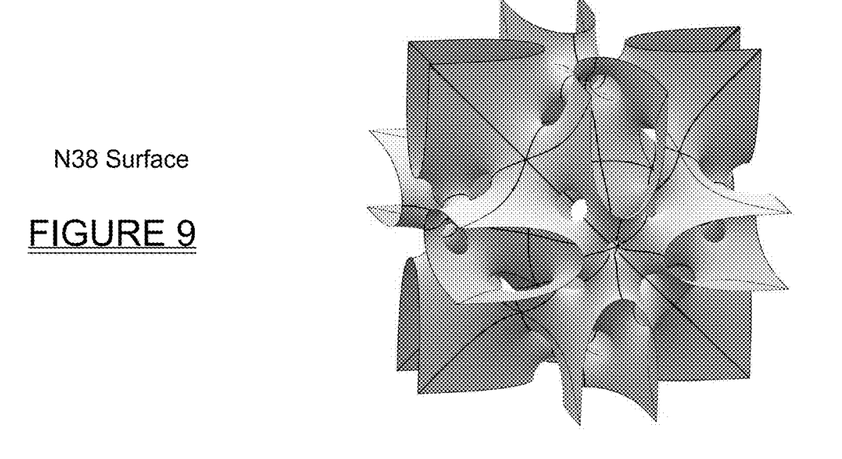
FIG. 9 is a simplified illustration of a N38 Surface that may be used to construct a 3D energy storage apparatus in accordance with the present disclosure.
Figure 10:
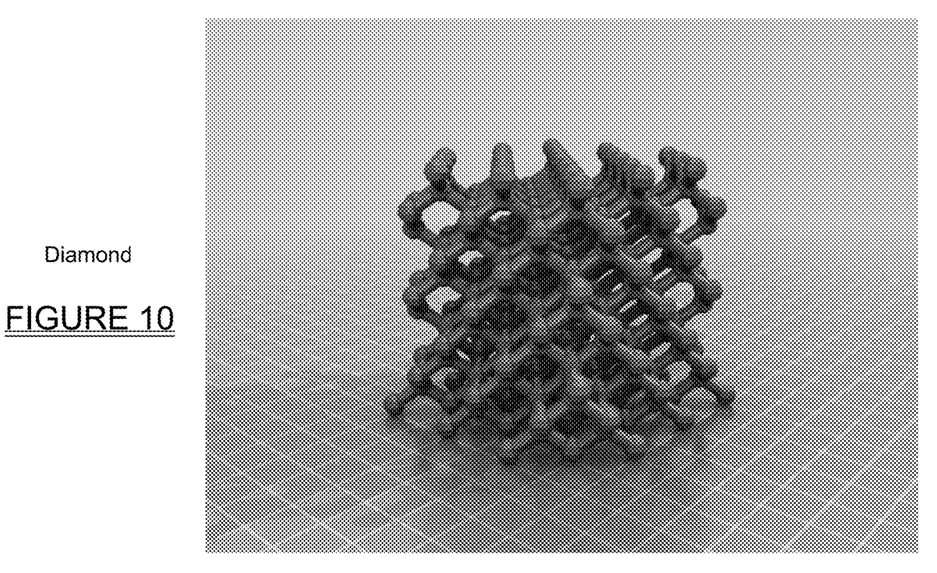
FIG. 10 is a simplified illustration of a Diamond surface that may be used to construct a 3D energy storage apparatus in accordance with the present disclosure.
Figure 11:
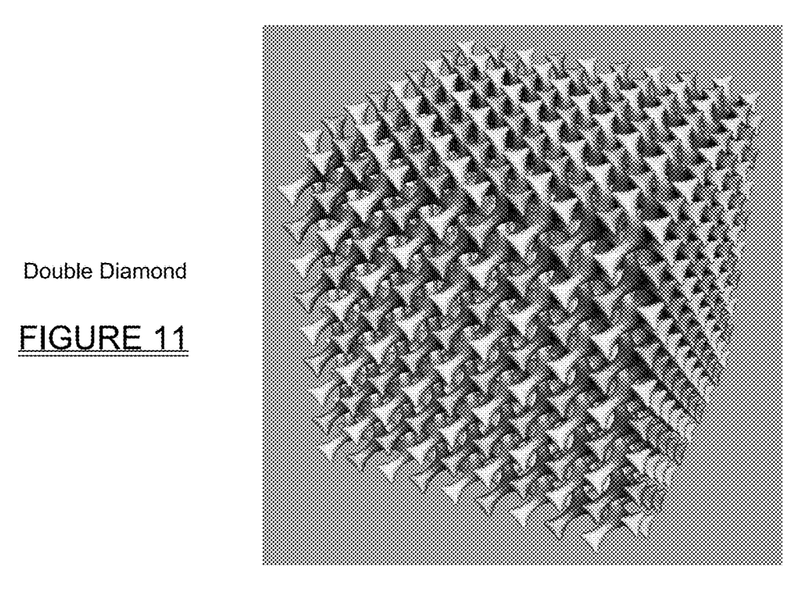
FIG. 11 is a simplified illustration of a Double Diamond surface that may be used to construct a 3D energy storage apparatus in accordance with the present disclosure.

FIG. 3 shows one high level example of how the charge collectors may be may be formed with an interpenetrating construction. In this example the wall portion 12' has charge collectors 24' and 26' disposed in interpenetrating fashion on opposite surfaces of the separator layer 18. Charge collector 24' is disposed in interpenetrating fashion with anode material layer 16 and charge collector 26' is disposed in interpenetrating fashion with cathode material layer 20. Such a construction minimizes electrical transport distances to the charge collector layers 24' and 26'.

In one example, the 3D structure 10 may be comprised of an ionically conductive solid electrolyte using, for example, a projection microstereolithography. The electrically conductive solid electrolyte has discrete, interpenetrating channels formed in it during the 3D printing process. The channels may be linear, but it will be appreciated that the channels will be non-linear for a 3D gyroid structure or most other 3D periodic or aperiodic structures. All the materials could be directly printed, and it is expected that this is likely to be a preferred implementation.

Subsequently, each of the channels 32 and 34 may be in-filled with active materials. For example, anode material may be filled into channel 32 and cathode material may be filled into channel 34. Each of the active materials preferably has some conductive filler loaded into it before it is deposited in its respective channel 32 or 34 to improve the electrical conductivity of its associated anode or cathode material. Such conductive filler material may be Graphene, carbon nanotubes (CNTs), copper particles or wires, aluminum particles or wires, or carbon black. Again, a principal objective is to create a nonplanar current collector that is continuous and creates short electronic transport distances. Next, each anode and cathode material has portions thereof attached to a respective current collector using a conductive epoxy, such as was described in connection with material sheets 24 and 26 (i.e., current collectors) in FIG. 1. An additional channel, represented by dashed line 36, may be formed in the solid electrolyte 30 for the separator as well. The completed structure forms a battery which can then be tested. Ultimately, it is expected to be advantageous, from a manufacturing/cost standpoint, to directly pattern all of the current collector, active materials, conductive fillers, and separator/electrolyte directly with a 3D fabrication process.

Aside from tuning parameters in the 3D structures used in the design, these designs can be used with any combination of anode, cathode, electrolyte, separator, and current collector materials that are normally used in conventional battery designs. These 3D energy storage structures of the present disclosure are expected to be useful in both primary and secondary batteries, and could be applied in the construction of batteries for use in any application where power or energy density is a concern, either in terms of battery lifetime or energy storage capability on a single charge. Single charge storage capability is especially important for batteries used with mobile devices such as smartphones, tablets, laptops, MP3 players, gaming devices, GPS units, portable radios, power tools, home energy storage devices, grid storage devices or systems, or portable water purification units, just to name a few potential applications. The teachings provided herein are also expected to be important in helping to make batteries lighter for a given storage capacity, as compared to conventional battery designs. Minimizing the weight of the battery for a given level of power density is also expected to be especially important with applications involving many of the above listed devices, as well as with applications involving battery powered automotive vehicles, battery backup systems for use on aircraft, or even remotely controlled drones.

Figure 12:
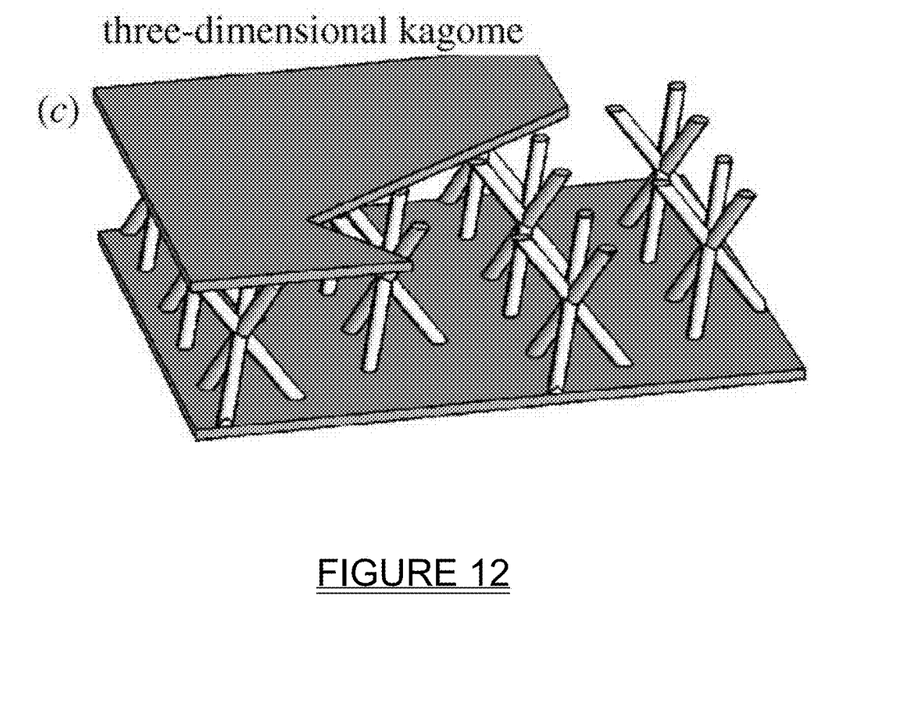
FIG. 12 is a simplified illustration of a Kagome lattice that may be used to construct a 3D energy storage apparatus in accordance with the present disclosure.

The present disclosure, in certain embodiments, makes use of geometries derived from triply periodic structures such as gyroids and Schwarz minimal surfaces, or other interpenetrating 3D structures, to achieve a significant improvement in power density over the previous conventional geometries at the same energy density and comparable feature (i.e., material thickness) sizes. A small number of examples of various types of periodic, 3D structures which may be used to form the 3D structure 10 are illustrated in FIGS. 4-12, which show a Schwartz P surface (FIG. 4), a Schwartz D surface (FIG. 5), a Neovius surface (FIG. 6), a N14 Surface (FIG. 7), a N26 Surface (FIG. 8), a N38 Surface (FIG. 9), a Diamond surface (FIG. 10), a Double Diamond surface (FIG. 11), and a Kagome lattice (FIG. 12). The present disclosure may make use of any of the foregoing surfaces discussed herein or virtually any other surface provided at the following link:

http:www.susqu.edu/brake/evolver/examples/periodic/periodic.html.

The precise surface configuration could also be derived using shape or topology optimization to yield many different structures.

The various designs proposed in the present disclosure can be combined with improved battery materials to yield even further gains in battery performance over conventional designs using existing materials. It is expected that changes in material properties will affect the parameters determining the size and shape of the surfaces, but will not affect substantially the performance improvements obtained by using interpenetrating, periodic, 3D designs instead of conventional planar-based battery designs. It will be appreciated that interpenetration is a key feature, and it is desirable to maximize surface area without sacrificing active material.

The architectures of the present disclosure are expected to have particular utility with applications requiring portable power sources such as mobile phones, computing tablets and other portable electronic devices. The embodiments disclosed herein are also able to be charged more rapidly for a given level of energy than conventional batteries. The designs and teachings described herein may account for different capacities of the active materials. The designs and configurations discussed herein may also have different sizes and shape and amounts of active materials to boost overall battery capacity and efficiency.

The 3D energy storage architectures disclosed herein can also yield lighter or smaller batteries for a given quantity of energy storage, as compared to conventional planar or jelly roll layouts. This makes the various embodiments of the present disclosure especially valuable where weight is an important concern, such as with electronic devices used in military applications or with remotely controlled, battery powered land and air vehicles such as drones.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An electrical energy storage apparatus, comprising:
   an interpenetrating, three dimensional, triply periodic structure including:
   an electrolyte material;
   a first non-planar layer of anode material to form an anode;
   a second non-planar layer of cathode material which conforms to a contour of the first non-planar layer of anode material, and which forms a cathode;
   the first non-planar layer and the second non-planar layer being formed so as to be interpenetrating in a triply periodic configuration, and which form a plurality of wall portions, and where the wall portions form non-parallel channels throughout the interpenetrating, three dimensional, triply periodic structure;
   a first current collector layer in communication with the first non-planar layer and forming a first electrode;
   a second current collector layer in communication with the second non-planar layer and forming a second electrode; and
   a third non-planar layer forming a separator material disposed between the first non-planar layer and the second non-planar layer, and following the contour of the first non-planar layer and the second non-planar layer, with the first non-planar layer, the second non-planar layer and the third non-planar layer forming integrated wall portions propagating in the interpenetrating, three dimensional, triply periodic structure;
   wherein the integrated wall portions forming the interpenetrating, three dimensional, triply periodic structure repeat periodically and uniformly in a plurality of differing non-parallel directions to provide channels extending in uniform, repeating patterns in the plurality of differing non-parallel directions, and wherein the integrated wall portions form uniform thicknesses; and
   wherein each of the first and second non-planar layers of material forming the anode and cathode, respectively, are exposed on opposing sides of the integrated wall portions throughout an interior of the structure.

2. The apparatus of claim 1, wherein the first current collector layer is non-planar.

3. The apparatus of claim 1, wherein the second current collector layer is formed adjacent the second non-planar layer of cathode material.

4. The apparatus of claim 1, wherein the first non-planar layer of anode material includes an electrically conductive filler material to improve electrical conductivity.

5. The apparatus of claim 1, wherein the second non-planar layer of cathode material includes an electrically conductive filler material to improve electrical conductivity.

6. The apparatus of claim 1, wherein the apparatus forms a battery.

7. The apparatus of claim 1, wherein the interpenetrating, three dimensional, triply periodic structure comprises one of:
   a gyroid;
   a double gyroid;
   a Schwartz surface;
   kelvin foam;
   an octet truss;
   a kagome lattice;
   a Neovius surface;
   an N14 Surface;
   an N26 Surface;
   an N38 Surface;
   a Diamond surface; and
   a Double Diamond surface.

8. The apparatus of claim 1, wherein the integrated wall portions provide a uniform, undulating, interpenetrating curvature throughout X, Y and Z dimensions of the structure.

* * * * *